(12) United States Patent
Puckett et al.

(10) Patent No.: US 12,374,852 B2
(45) Date of Patent: Jul. 29, 2025

(54) GENERATION OF ENTANGLED PHOTONS IN AN OPTICAL BRAGG RESONATOR

(71) Applicant: Honeywell International Inc., Charlotte, NC (US)

(72) Inventors: Matthew Wade Puckett, Phoenix, AZ (US); Chad Fertig, Bloomington, MN (US); Matthew Robbins, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 880 days.

(21) Appl. No.: 17/567,791

(22) Filed: Jan. 3, 2022

(65) Prior Publication Data

US 2023/0216267 A1 Jul. 6, 2023

(51) Int. Cl.
*H01S 3/102* (2006.01)
*G02F 1/35* (2006.01)
*H01S 3/00* (2006.01)
*H01S 3/067* (2006.01)

(52) U.S. Cl.
CPC .......... *H01S 3/1024* (2013.01); *G02F 1/3503* (2021.01); *H01S 3/06741* (2013.01); *H01S 3/0675* (2013.01); *G02F 1/353* (2013.01); *H01S 3/0092* (2013.01)

(58) Field of Classification Search
None
See application file for complete search history.

(56) References Cited

U.S. PATENT DOCUMENTS

| | | | |
|---|---|---|---|
| 7,859,744 B2 | 12/2010 | Trifonov | |
| 10,372,014 B1* | 8/2019 | Vidrighin | G02F 1/3536 |
| 2019/0280456 A1* | 9/2019 | Williams | H01S 3/08059 |
| 2023/0012476 A1* | 1/2023 | Fertig | G02F 1/365 |
| 2023/0420046 A1* | 12/2023 | Bustard | G02F 1/3536 |

FOREIGN PATENT DOCUMENTS

| | | | | |
|---|---|---|---|---|
| DE | 112012000154 T5 * | 7/2013 | | G02F 1/37 |
| JP | 5723260 B2 | 5/2015 | | |
| JP | 6115189 B2 | 4/2017 | | |
| JP | 6287152 B2 | 3/2018 | | |

OTHER PUBLICATIONS

Svozilik et al. "Bragg reflection waveguide as a source of wavelength-multiplexed polarization-entangled photon pairs", Optics Express, 2012, pp. 15015-15023, vol. 20, Issue 14.

(Continued)

*Primary Examiner* — Eric L Bolda
(74) *Attorney, Agent, or Firm* — Fogg & Powers LLC

(57) ABSTRACT

Among other embodiments, a method for generated entangled photons is disclosed. The method comprises generating photons in a fundamental mode and converting the photons from the fundamental mode to a higher-order mode. The method further comprises generating, by a Bragg resonator configured to receive the photons, entangled photons in the fundamental mode from the converted photons in the higher-order mode. The method further comprises outputting the generated entangled photons from the Bragg resonator.

20 Claims, 7 Drawing Sheets

(56) References Cited

OTHER PUBLICATIONS

Xie et al., "On-Chip Fabry-Perot Bragg Grating Cavity Enhanced Four-Wave Mixing", ACS Photonics, 2020, pp. 1009-1015, vol. 7.
Fertig, Chad et al., "Integrated Photonics Source and Detector of Entangled Photons", U.S. Appl. No. 16/803,841, filed Feb. 27, 2020, pp. 1 through 34, Published US.
Fertig, Chad et al., "Optically Resonant Device for Entangled Photon Generation", U.S. Appl. No. 17/374,745, filed Jul. 31, 2021, pp. 1 through 32.
Puckett, Matthew W. et al., "Integrated Photonics Vertical Coupler", U.S. Appl. No. 16/803,831, filed Feb. 27, 2020, pp. 1 through 31, Published US.
Puckett, Matthew W. et al., "Integrated Photonics Mode Splitter and Converter", U.S. Appl. No. 16/803,820, filed Feb. 27, 2020, pp. 1 through 31, Published: US.

\* cited by examiner

GENERATION OF ENTANGLED PHOTONS IN AN OPTICAL BRAGG RESONATOR

STATEMENT REGARDING FEDERALLY SPONSORED RESEARCH OR DEVELOPMENT

This invention was made with U.S. Government support. The Government has certain rights in the invention.

BACKGROUND

Integrated photonics systems serve an increasingly important role in space systems and communications engineering. Such systems employ a pump light source to generate photons to a second-order nonlinear waveguide or other photon generating element. The photon generating element converts the pump light photons to a pair of photons having an entangled state through a process known as spontaneous parametric down-conversion (SPDC). The quantum states of the entangled photon pair may be highly entangled in time, energy, momentum, polarization, or a combination thereof. These entangled properties provide useful applications for a wide variety of uses, including remote sensing, communication between satellites, atomic clock synchronization, and other uses.

SUMMARY

The details of one or more embodiments are set forth in the summary and description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a photonics circuit is provided. The photonics circuit comprises a first optical coupler configured to receive photons and to convert the received photons from a fundamental mode to a higher-order mode. The photonics circuit further comprises a first Bragg resonator configured to receive the received photons from the first optical coupler. The first Bragg resonator comprises a first primary Bragg element configured to receive the photons in the higher-order mode. The first Bragg resonator further comprises a second primary Bragg element, and at least one first waveguide separating the first primary Bragg element and the second primary Bragg element. The at least one first waveguide is configured to generate entangled photons in the fundamental mode from the received photons in the higher-order mode. The first primary Bragg element and the second primary Bragg element are configured to reflect the received photons. At least one of the first primary Bragg element or the second primary Bragg element is configured to pass the generated entangled photons in the fundamental mode. The first Braff resonator further comprises at least one output port coupled to the first Bragg resonator, wherein the at least one output port is configured to output the generated entangled photons.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
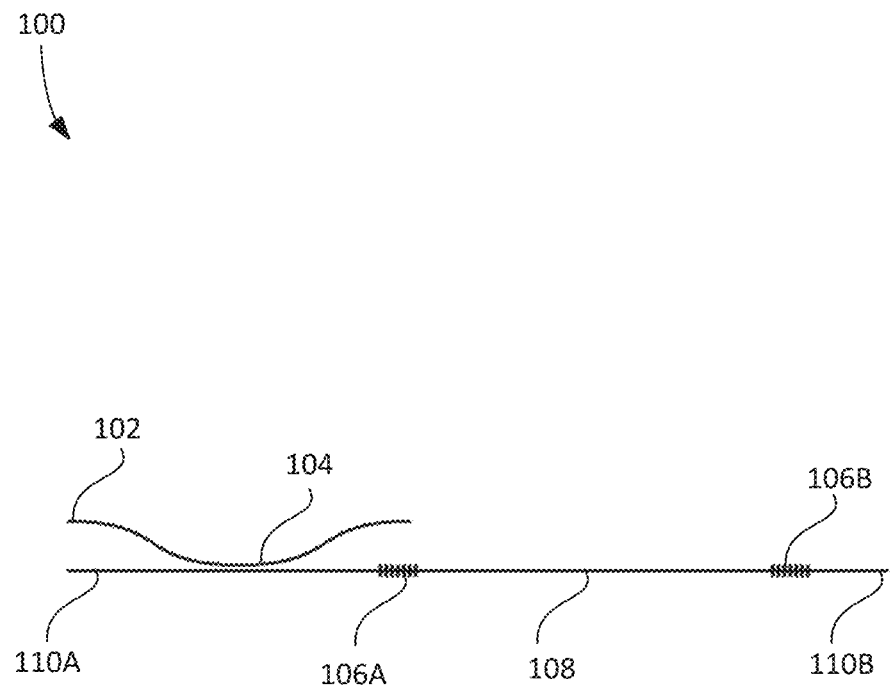
FIG. 1 depicts an exemplary photonics circuit including a Bragg resonator configured to generate entangled photons.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

Integrated photonics systems coherently output entangled photons so that receiving systems can utilize the properties of entangled photons. Difficulties arise, however, both in optimizing entangled photon generation by the photon generation element and in extracting the entangled photons from the system. Inherent losses from imperfect optics or system configuration can reduce the power output of entangled photons. Additionally, extracting entangled photons can prove difficult without ensuring phase-matching between the correlated entangled photon pairs.

Some integrated photonics systems utilize a resonator to magnify the power of pump light supplied by the pump light source and hence, the generation of entangled photons from the photon generating element. Resonators can be a useful option to increase the output of entangled photons without having to increase the power supplied by the pump light source. However, these systems generally require a high degree of precision to utilize the advantages from a resonator, and imprecise system configuration (e.g., due to imperfect coupling to the resonator) can detrimentally affect total power efficiency. For example, imprecise optical design can lead to incoherence and, in some cases, failure to extract entangled photons. Even mild imperfections can decrease the quality factor and extraction efficiency for entangled photons. In particular, coupling imperfections in the resonator can significantly reduce total power efficiency, since these imperfections exponentially magnify power losses.

The present disclosure reduces the power coupling losses in an optical resonator through eliminating the dependence on optical coupling within the resonator. This solution improves entangled photon generation by enhancing the power throughput in the resonator while simplifying the optics needed to implement both single and multiple resonant integrated photonics systems. For multiple resonant systems, the present disclosure also enables the source resonator to be independently defined relative to other resonators in the architecture.

Referring to the accompanying drawings, FIG. 1 depicts an exemplary photonics circuit 100 including a Bragg resonator configured to generate entangled photons. Photonics circuit 100 includes an optical coupler 104, a Bragg resonator 108 defined by two Bragg elements 106A, 106B, and outputs 110A, 110B. Input photons received from a light source (not shown in FIG. 1) enter input 102 of optical coupler 104 in the fundamental mode. As used herein, "input photons" refers to the source photons that do not have entangled properties, such as pump photons from a pump laser. Optical coupler 104 (e.g., an asymmetric directional coupler, an asymmetric adiabatic coupler, or grating-assisted coupler) is configured to convert the received input photons from the fundamental mode to a higher-order mode, such as a second-order mode. Converting the photons to a higher-order mode enables the possibility of generating entangled photons through SPDC, whereas in the fundamental mode no significant entangled photon generation is achieved.

Optical coupler 104 provides the input photons to Bragg resonator 108, which is directly or indirectly coupled to optical coupler 104. In some embodiments, Bragg resonator 108 is implemented on one or more waveguides with Bragg elements 106A, 106B formed thereon, which enables Bragg resonator 108 to receive the input photons provided from optical coupler 104 through the one or more waveguides. Bragg resonator 108 acts as a resonator to the input photons received by optical coupler 104. Therefore, Bragg elements 106A, 106B are spaced so that Bragg resonator 108 resonates at the frequency/wavelength of the received input photons. Bragg elements 106A, 106B can be composed of Bragg gratings with sufficient grating periods to reflect photons of a particular wavelength that engage the Bragg elements. In an embodiment, each Bragg element 106A, 106B is composed of a grating pattern that creates a phase shift (a π shift, for example) for the input light that interfaces with the respective Bragg element. The elemental phase shifts create a resonance within the frequency band of Bragg resonator 108. The resonant frequenc(ies) of Bragg resonator 108 are dependent on the spatial separation between the Bragg elements 106A, 106B, and the grating characteristics (length, period, strength, etc.) of the Bragg elements 106A, 106B. Operating Bragg resonator 108 at the frequency/wavelength of the input photons increases the generation rate of entangled photons by multiple orders of magnitude.

At least a portion of the input photons received by Bragg element 106A are passed towards Bragg element 106B in the higher-order mode. When input photons reach Bragg element 106B, they reflect back towards Bragg element 106A, and the process of oscillating the input photons between the two ends of Bragg resonator 108 is repeated for as long as the resonator operates at the resonance wavelength of the input photons. At some point, input photons traversing in Bragg resonator 108 undergo SPDC in which a photon splits into two daughter photons in an entangled spin state. Consistent with principles of momentum and energy conservation, these daughter photons propagate at about half the frequency of the photons entering Bragg resonator 108. For example, if the input photons entering Bragg resonator 108 have a wavelength of 1550 nm, the resultant entangled photons generated by a photon undergoing SPDC will have a wavelength of approximately 775 nm. Due to the spacing and grating properties of Bragg elements 106A, 106B, however, Bragg resonator 108 does not act as a resonator for the generated down-converted photons because the configuration of Bragg resonator 108 corresponds to the resonance of the input photons entering Bragg resonator 108 that have not yet undergone SPDC. Referencing the numerical example above, the grating properties of Bragg resonator 108 enable resonance at the 1550 nm wavelength for the input photons, but not at the 775 nm wavelength for the downconverted entangled photons.

Since Bragg resonator 108 is not resonant for the generated entangled photons, the entangled photons can pass through either Bragg element 106A or 106B without reflecting back into the resonator. For example, if a photon approaching Bragg element 106B splits into two entangled photons, the entangled photons can exit through Bragg element 106B to output 110B. Similarly, if a photon approaching Bragg element 106A splits into two entangled photons, the entangled photons can exit Bragg element 106A towards output 110A. As previously mentioned, entangled photons are generated in the fundamental mode, which enables entangled photons exiting Bragg element 106A to propagate towards output 110A instead of traversing through optical coupler 104 back to input 102. Outputs 110A, 110B can be output ports used to transmit entangled photons out of photonics circuit 100 or can be coupled to additional waveguides or couplers to couple the extracted entangled photons out of photonics circuit 100. In some embodiments, outputs 110A, 110B can be coherently combined by phase-matching the output entangled photons through additional waveguides or optics (not shown in FIG. 1) to combine the entangled photons into a single output.

Bragg elements 106A, 106B can be separated by a second-order nonlinear waveguide or other photon generating element configured to generate entangled photons. However, in some embodiments, Bragg resonator 108 is implemented by free space optics. In such embodiments, Bragg elements 106A, 106B are replaced by mirrors or other reflectors, and the Bragg resonator 108 implemented by free space separation between reflectors 106A, 106B with a nonlinear crystal acting as a photon generation element positioned between the two reflectors.

Note that in the embodiment shown in FIG. 1, optical coupler 104 is positioned outside Bragg resonator 108, and photonics circuit 100 has no additional couplers or structures within Bragg resonator 108. This configuration allows entangled photons to enter and exit Bragg resonator 108 (by passing through Bragg elements 106A or 106B) without being perturbed by optical coupler 104 or any other structure used to transport or extract photons in the circuit architecture. As a result, the coupling loss efficiency associated with imperfections or aberrations in coupling the input photons into Bragg resonator 108 and extracting down-converted entangled photons out of Bragg resonator 108 is reduced. Even if optical coupler 104 imperfectly couples input photons to Bragg resonator 108, any losses attributable to coupling inefficiencies linearly (as opposed to exponentially) reduce total power efficiency, thereby improving the total power efficiency of the system.

In some embodiments, Bragg resonator 108 can facilitate mode conversion between the input photons entering the resonator. Still referring to FIG. 1, Bragg resonator 108 is configured so that input photons propagate towards Bragg element 106B in a higher-order mode while input photons reflected back towards Bragg element 106A propagate in the fundamental mode. To illustrate mode conversion, consider input photons entering Bragg element 106A through optical coupler 104. As previously described, these photons will resonate within Bragg resonator 108 and enter the resonator in the higher-order mode. After reflecting through Bragg element 106A, some of these photons undergo SPDC to generate two entangled photon pairs in the fundamental mode, which can then exit Bragg resonator 108 through Bragg element 106B. However, some photons may not immediately undergo SPDC and instead contact with Bragg element 106B in the higher-order mode.

In these embodiments, Bragg element 106B is configured to reflect the input photons back toward Bragg element 106A while converting the input photons back into the fundamental mode. Since the input photons do not split into entangled photon pairs while propagating in the fundamental mode, no entangled photons will be generated while the input photons traverse towards Bragg element 106A from the right end of Bragg resonator 108. Upon reaching the other end of Bragg resonator 108, Bragg element 106A is configured to reflect the input photons back towards Bragg element 106B while converting the input photons from the fundamental mode to the higher-order mode, thereby enabling reflected input photons to undergo SPDC and generate entangled pairs. This configuration has the effect of controlling which output receives the entangled photon pairs. When Bragg elements 106A, 106B facilitate mode conversion in the example shown in FIG. 1, entangled photons exit Bragg resonator 108 only though Bragg element 106B. Accordingly, output 110B functions as an output for the entangled photons.

Figure 2:
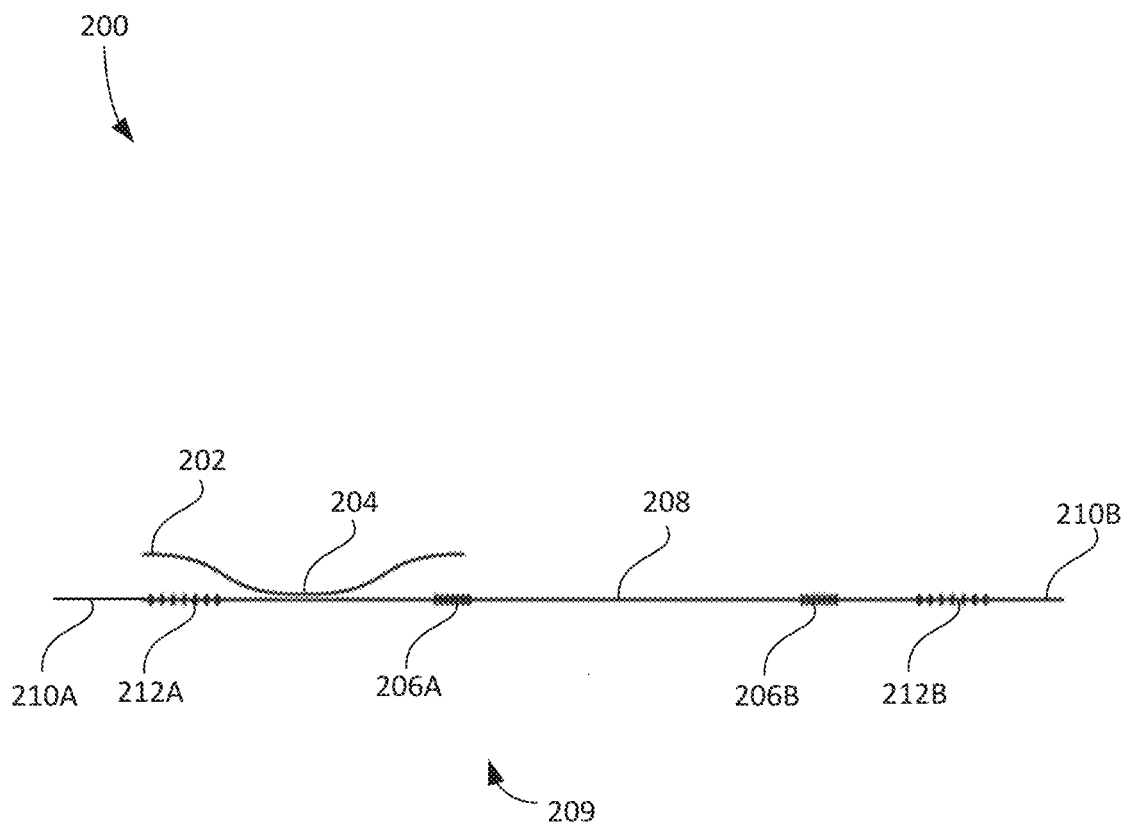
FIG. 2 depicts an exemplary photonics circuit that includes second Bragg elements configured to control the output of entangled photons.
Figure 3:
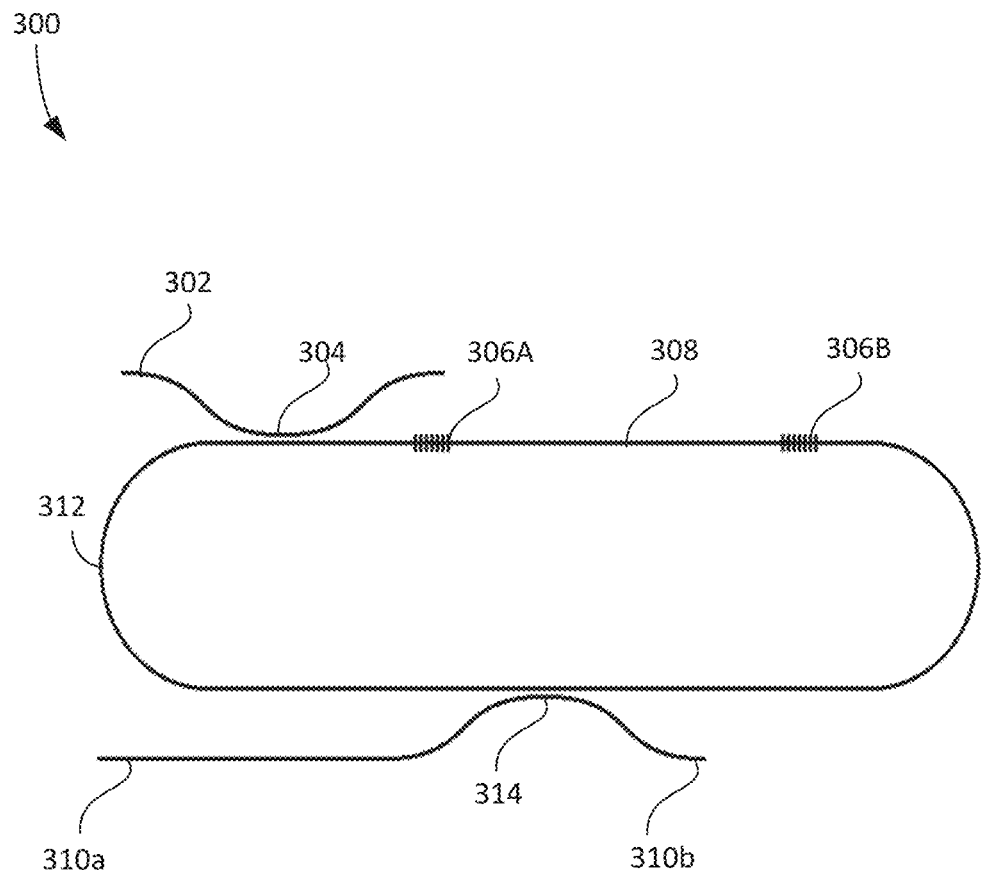
FIG. 3 depicts an exemplary photonics circuit with a circular waveguide output configuration.

Because photonics circuit 100 is resonant only to the input photons that enter Bragg resonator 108 and not to the down-converted entangled photons, photonics circuit 100 describes a single resonant architecture for extracting entangled photons. However, photonics circuit 100 can be further modified and adapted for a multiple resonant structure (a system that is resonant both for the input photons as well as the generated entangled photons) as shown in FIGS. 2-3. FIG. 2 illustrates a multiple resonant architecture based on a standing wave implementation. Conversely, FIG. 3 illustrates a multiple resonant architecture based on a traveling wave implementation.

Referring to FIG. 2, photonics circuit 200 includes optical coupler 204 and a first Bragg resonator 208 defined by two Bragg elements 206A, 206B to generate entangled photons from a light source. These components operate similarly to their counterparts described in FIG. 1; that is, input photons enter optical coupler 204 through input 202 in the fundamental mode, then optical coupler 204 converts the photons from the fundamental mode to a higher-order mode, and the higher-order mode photons propagate within first Bragg resonator 208 until they split into a pair of entangled photons.

As previously described, first Bragg resonator 208 acts as a resonator for the input photons from the light source and not as a resonator for entangled photons. In contrast to FIG. 1, photonics circuit 200 includes a second Bragg resonator 209 defined by secondary Bragg elements 212A, 212B. Second Bragg resonator 209 acts as a resonator for entangled photons generated from first Bragg resonator 208, while first Bragg resonator 208 acts as a resonator for the input photons received from optical coupler 204. In operation, generated entangled photons exit first Bragg resonator 208 either from primary Bragg element 206A or 206B towards either secondary Bragg element 212A or 212B. Since second Bragg resonator 209 acts as a resonator for the entangled photons, secondary Bragg elements 212A, 212B are configured to reflect a portion of the generated entangled photons. For example, the secondary Bragg elements 212A, 212B can be composed of a grating period that causes a $\pi$ phase shift at the frequency of the entangled photons. The entangled photons can re-enter and pass-through first Bragg resonator 208 because first Bragg resonator 208 does not resonate at the wavelength of the entangled photons (due to the grating structures of Bragg elements 206A, 206B), and thus first Bragg resonator 208 does not significantly reflect any of the entangled photons propagating in second Bragg resonator 209.

Entangled photons can exit second Bragg resonator 209 through either output 210A or 210B. In some embodiments, one output may receive more entangled photons than another output, and in further embodiments, all or significantly all of the entangled photons exit through only one of the outputs. In such embodiments, secondary Bragg element 212A has a different grating length than secondary Bragg element 212B. For example, secondary Bragg element 212A can have twice the grating length of secondary Bragg element 212B. The difference in grating length causes more entangled photons to pass through the Bragg element with the shortest grating length, which in the example above would be secondary Bragg element 212B. By significantly increasing the grating length of secondary Bragg element 212A relative to secondary Bragg element 212B, nearly all the entangled photons will exit through secondary Bragg element 212B. In this way, the output of entangled photons can be controlled even without facilitating mode conversion between Bragg elements 206A, 206B in first Bragg resonator 208.

Even in a multiple resonant structure, such as photonics circuit 200, an entangled photon generating resonator (first Bragg resonator 208) can be defined independently of other resonators in the architecture. Despite first Bragg resonator 208 being nested in second Bragg resonator 209, defining the length of first Bragg resonator 208 does not impact the optical properties of second Bragg resonator 209 because, as previously described, first Bragg resonator 208 resonates independently of second Bragg resonator 209.

Referring to FIG. 3, an exemplary photonics circuit 300 is shown with a circular waveguide output configuration. Photonics circuit 300 includes first optical coupler 304 having an input 302 that receives input photons from a light source, (first) Bragg resonator 308 defined by Bragg elements 306A and 306B, and one or more waveguides 312 connecting the output of Bragg resonator 308. Photonics circuit 300 represents an exemplary embodiment of a traveling wave implementation of the architecture described in FIG. 2. First optical coupler 304 and Bragg resonator 308 operate similarly to their counterparts described in FIGS. 1-2.

Entangled photons generated by Bragg resonator 308 exit through either Bragg element 306A or 306B and are collected by waveguide(s) 312. Waveguide 312 couples the entangled photons to a second optical coupler 314. In embodiments where entangled photons exit Bragg resonator 308 through both Bragg elements 306A, 306B, second optical coupler 314 includes two input ports to receive entangled photons propagating in either direction of waveguide 312. In some embodiments, waveguide 312 acts as a resonator for the down-converted entangled photons as the entangled photons propagate through waveguide 312 to second optical coupler 314. Second optical coupler 314 is configured to provide the entangled photons to at least one output 310 through an output port of second optical coupler 314. When generated entangled photons propagate in a single direction in waveguide 312, second optical coupler 314 couples all the entangled photons to output 310a. However, in embodiments where the generated entangled photons propagate through waveguide 312 in opposing directions, second optical coupler 314 couples the entangled photons to another output 310b. Second optical coupler 314 may also convert the entangled photons to a higher-order mode.

Figure 4:
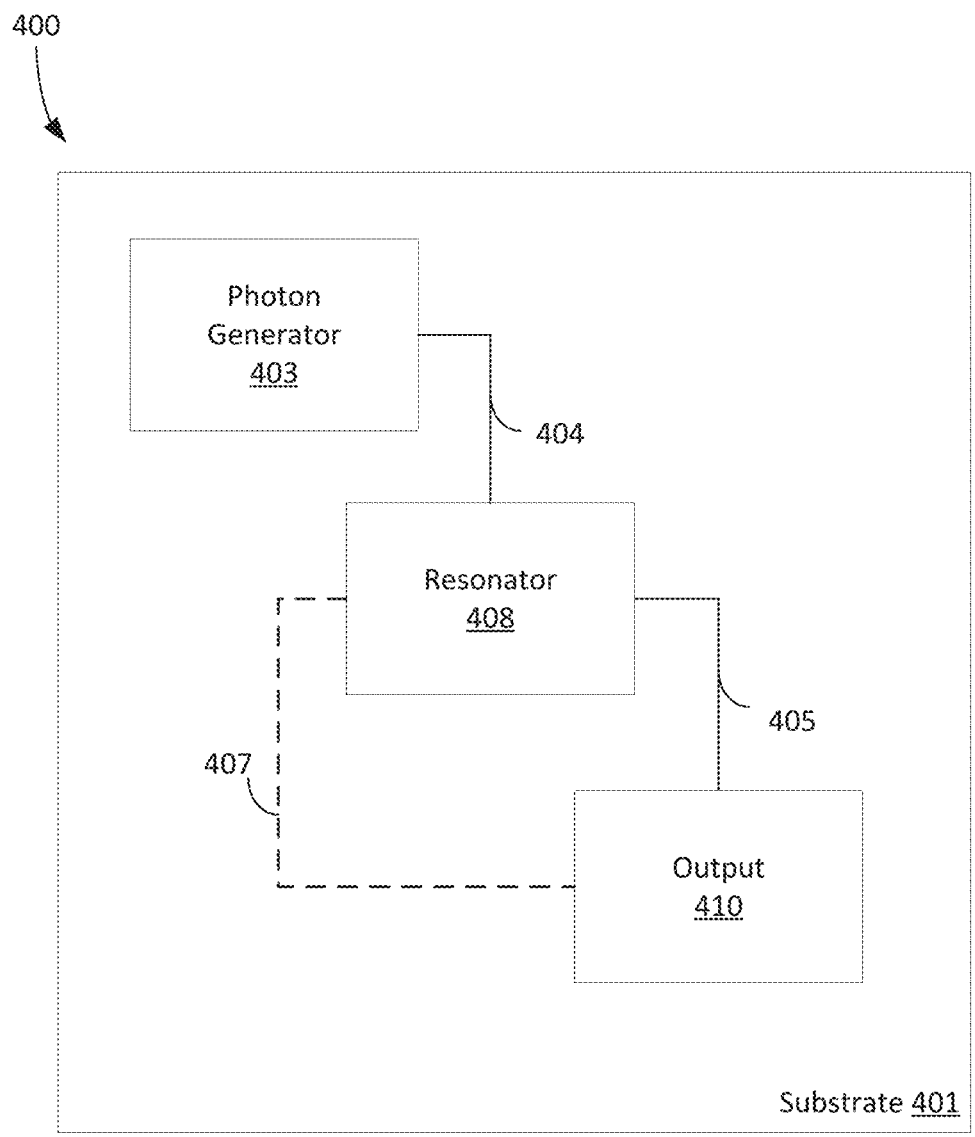
FIG. 4 depicts a system configured to generate entangled photons from a Bragg resonator.

FIG. 4 depicts an exemplary system 400 configured to generate entangled photons from a Bragg resonator based on the optics described in FIGS. 1-3. System 400 includes a circuit, such as a photonics circuit, disposed on a substrate 401. In some embodiments, the substrate 401 is an integrated photonics chip implemented on a very small (e.g., micro) scale. Substrate 401 comprises a material suitable for deposition of components having second-order optical nonlinearities, such as silicon-dioxide or other materials. Substrate 401 may further include other optical components or electric and processing circuity not shown in addition to the architecture illustrated and described below. While system 400 can be implemented on more than one substrate 401, the optical functionality for producing and receiving entangled photons can also be implemented on a single, integrated platform, thereby yielding reduced optical losses, enhanced mode overlap, efficient filtering of photons, increased interferometer contrast, and improved mechanical robustness while reducing size weight and power (SWaP) requirements when compared to fiber or free space-based systems.

Photon generator 403 is a light source configured to generate a beam of photons that propagate in the fundamental mode to optical coupler 404. Photon generator 403 can be, for example, a continuous wave laser configured to generate pump light photons; however, photon generator 403 can include other photon generating sources. Optical coupler 404 converts the pump photons to a higher-order mode (e.g., second-order mode) and couples the excited pump photons to Bragg resonator 408. In some embodiments, optical coupler 404 includes one or more nanowire waveguides made of a second-order nonlinear material such as lithium niobate.

As previously described, Bragg resonator 408 acts as a resonator for the pump photons and is configured to generate down-converted entangled photons in the fundamental mode from the pump photons. In some embodiments, a second resonator (not shown in FIG. 4) can be coupled to act as a resonator for the entangled photons generated from Bragg resonator 408 as described in FIGS. 2-3. One or more waveguides 405 are coupled to Bragg resonator 408 and configured to collect the entangled photons to output 410. Additional waveguides 407 can optionally couple to Bragg resonator 408 and collect entangled photons generated from Bragg resonator 408 to output 410 from a different optical pathway. Output 410 can be coupled (e.g., optically, electrically, or communicatively) to additional optical devices or systems that receive the entangled photons. For example, entangled photons can be provided through output 410 to additional optics that collect and transmit the entangled photons to an optical receiver of a satellite positioned remotely from system 400.

Figure 5A:
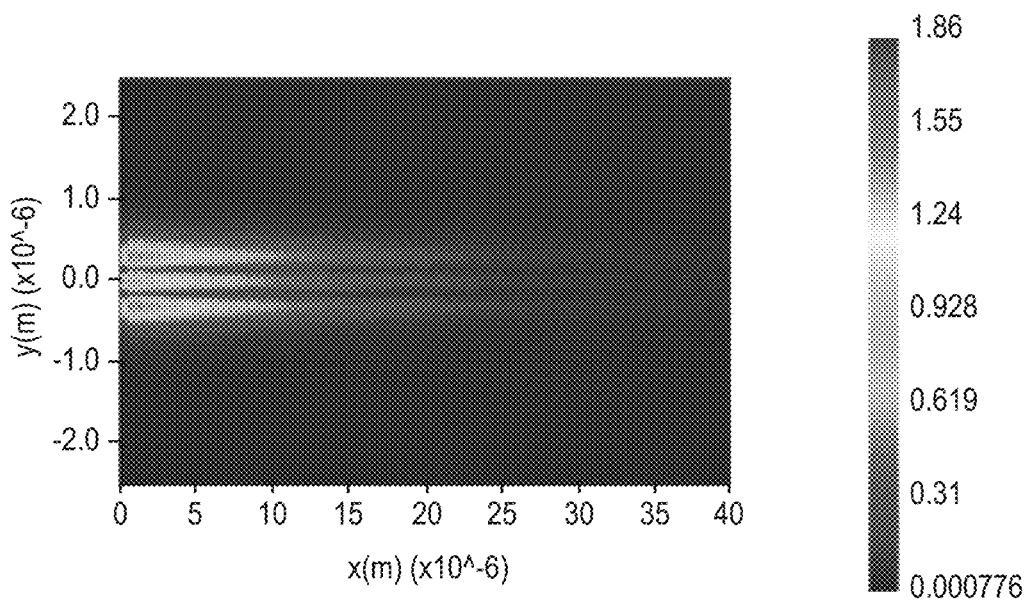
FIGS. 5A-5B depict graphical representations of light propagating through a Bragg resonator.
Figure 5B:
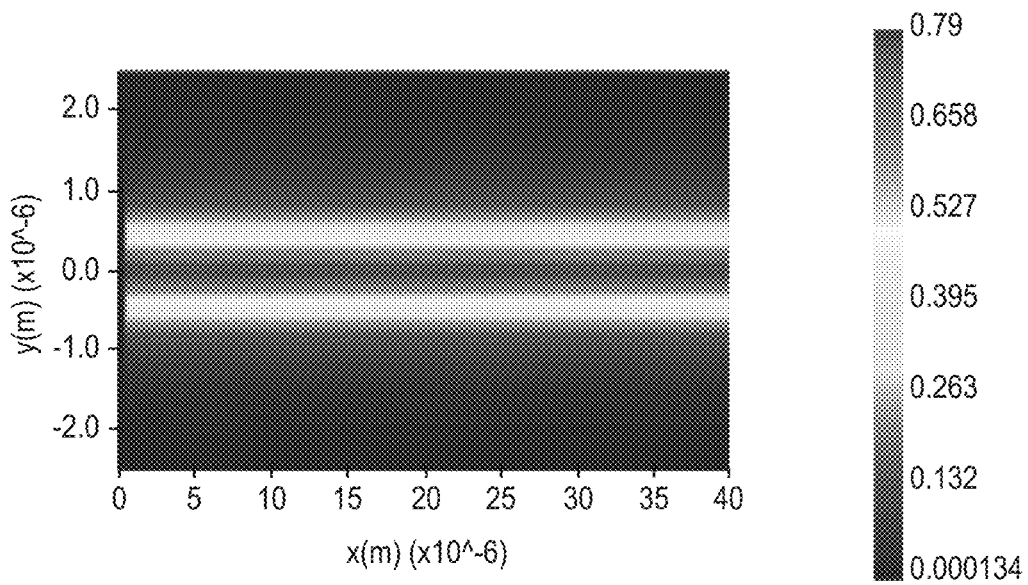

FIGS. 5A-5B depict graphical representations of light propagating through a Bragg resonator. FIG. 5A depicts pump light intensity as a function of position while FIG. 5B depicts light intensity of down-converted photons as a function of position. Referring to FIG. 5A, a Bragg element is placed approximately 0.5 microns away from the origin in the +x direction. Incoming light reaches the Bragg element and is then reflected in the −x direction. A small portion of the light passes through the Bragg element and rapidly decays as a function of the +x direction, becoming negligible 40 microns away from the Bragg element. In contrast, FIG. 5B shows light from down-converted photons generated from the light shown in FIG. 5A. Although a Bragg element is placed approximately 0.5 microns from the origin, FIG. 5 illustrates substantially all of the light passing through the Bragg element at the same intensity without getting reflected by the Bragg element.

Figure 6A:
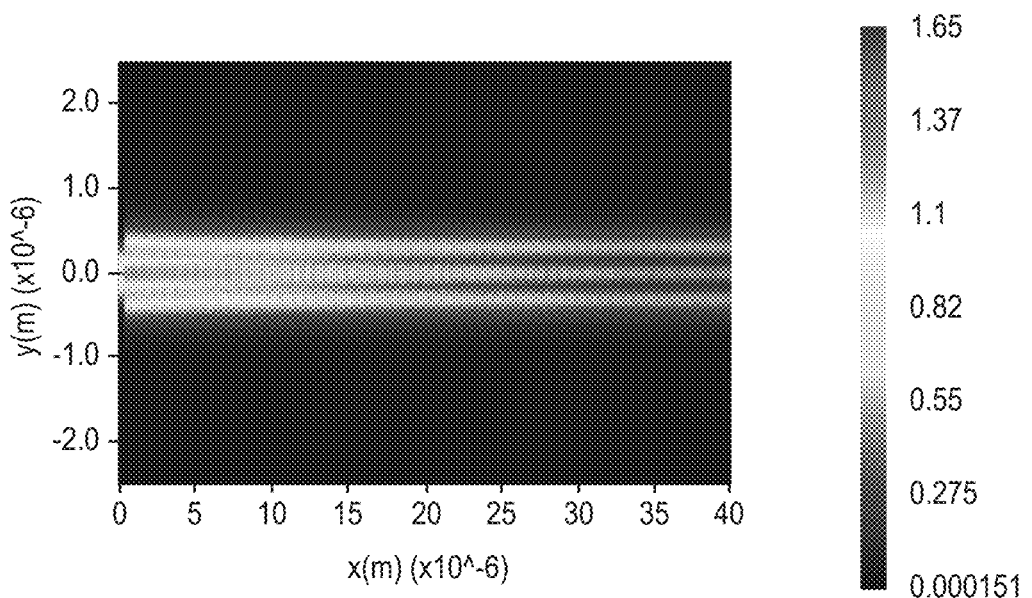
FIGS. 6A-6B depict graphical representations of mode conversion of light propagating through a Bragg resonator.
Figure 6B:
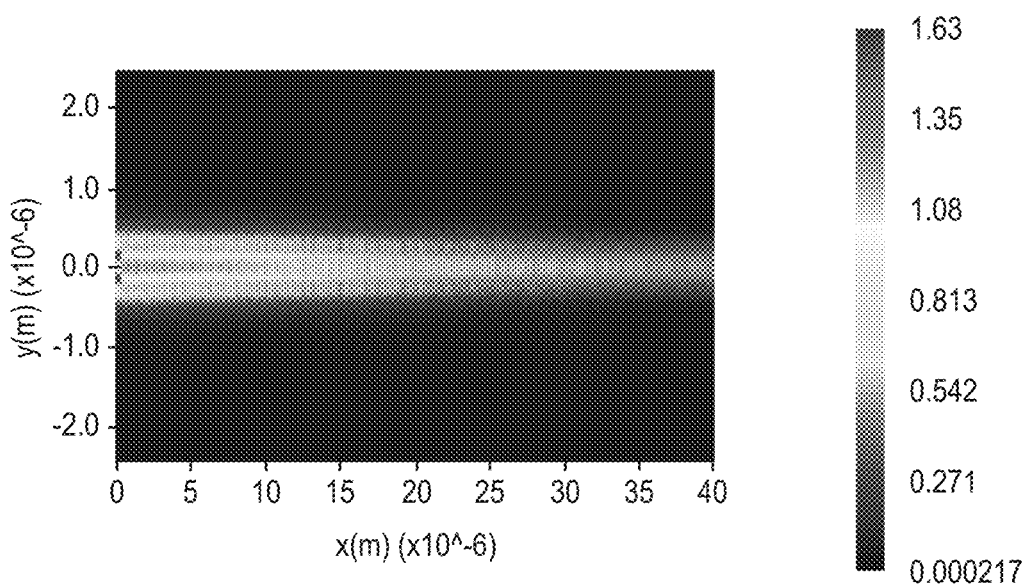

FIGS. 6A-6B depict graphical representations of mode conversion of pump light propagating through a Bragg resonator. FIG. 6A depicts pump light converted from a higher-order mode to the fundamental mode, while FIG. 6B depicts pump light converted from the fundamental mode to a higher-order mode. Referring to FIG. 6A, a Bragg element is placed approximately 0.5 microns from the origin in the +x direction. As higher-order light propagates in the +x direction, it is converted to the fundamental mode. Conversely, FIG. 6B shows that pump light reflected by a Bragg grating in the fundamental mode is converted to a higher-order mode as it propagates in the +x direction. Mode conversion between pathways in a Bragg resonator enables the entangled photons to be selectively output to one end of the Bragg resonator.

Figure 7:
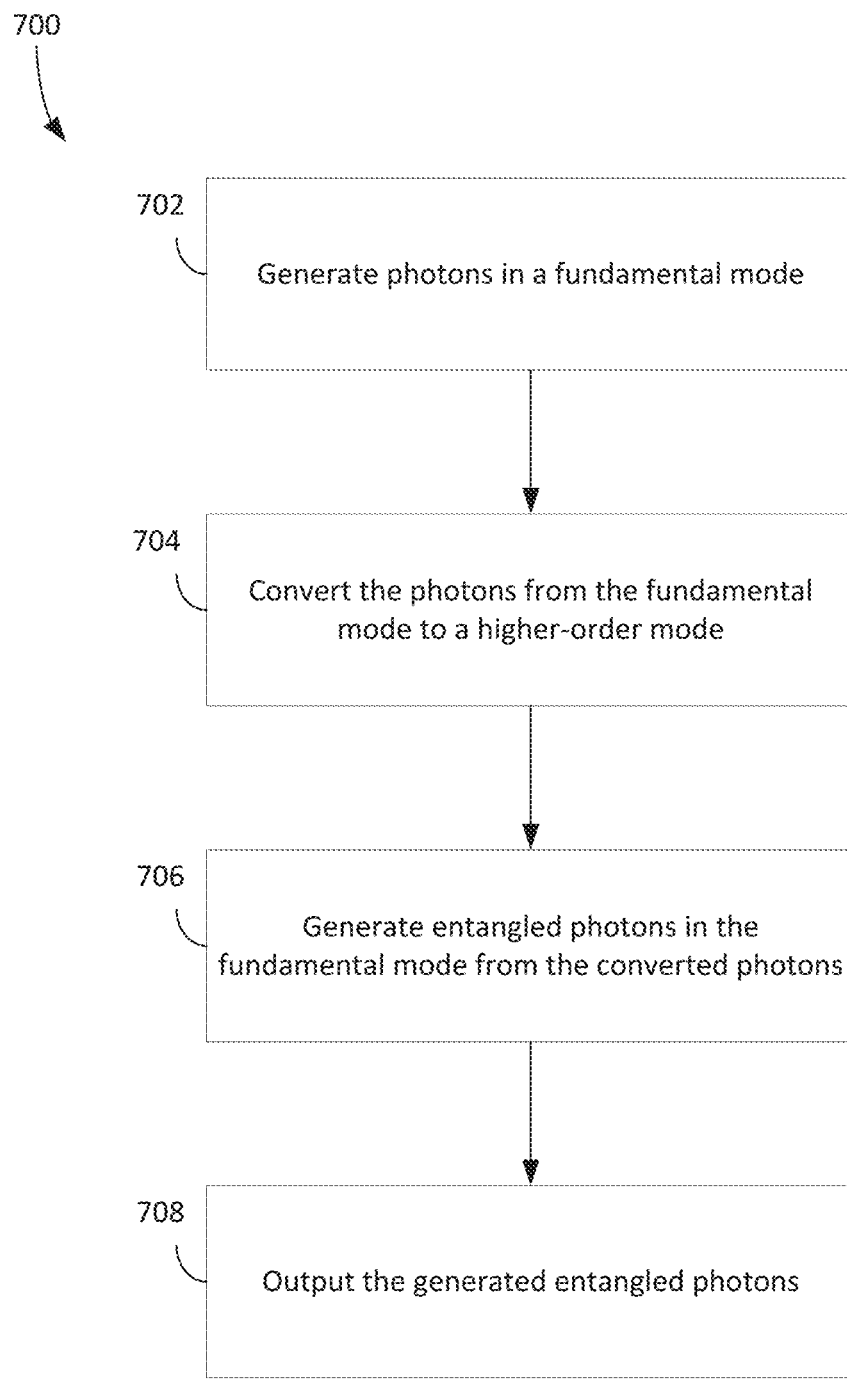
FIG. 7 depicts a flow diagram illustrating an exemplary method for generating down-converted entangled photons.

FIG. 7 depicts a flow diagram illustrating an exemplary method for generating down-converted entangled photons. Method 700 may be implemented via the techniques described with respect to FIGS. 1-6, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Beginning at block 702, method 700 generates photons at a first wavelength/frequency in the fundamental mode, for example, through a pump laser or other light source. At block 704, the photons are converted from the fundamental mode to a higher-order mode, for example, by an optical coupler that receives the photons from the pump laser. In some embodiments, the optical coupler is an asymmetric directional coupler having multiple input and output ports that receives the pump photons at one of the input ports, converts the pump photons to the second-order mode, and outputs the higher-mode pump photons through an output port.

Next, method 700 generates entangled photons in the fundamental mode from the higher-mode pump photons at block 706. As an example, method 700 implements a Bragg resonator that receives the pump photons in the higher-order mode, in which the Bragg resonator includes a photon-generating element such as a second-order nonlinear waveguide that is configured to convert the pump photons into a pair of entangled photons in the fundamental mode. The entangled photons have a second wavelength/frequency distinct from the first wavelength/frequency of the pump photons, so the Bragg resonator will not be resonant for the generated entangled photon pairs. The non-resonance of the entangled photons facilitates the output of the entangled photon pairs at block 708 through at least one output port of the Bragg resonator.

Method 700 may optionally include further or alternative steps. In one embodiment, method 700 performs mode-conversion on the pump photons by converting the pump photons from the higher-order mode to the fundamental mode at one end of the Bragg resonator, and converting the pump photons from the fundamental mode to the higher-order mode at another end of the Bragg resonator. Additionally, method 700 can selectively output entangled photons from a desired output port through the mode-conversion described above or by implementing a second Bragg resonator that is resonant with respect to the entangled photons at the second wavelength/frequency. Specifically, by adjusting the period gratings of the peripheral Bragg elements of the second Bragg resonator to be unequal, the output rate of the entangled photons can be altered so that more entangled photons output through the desired output port. Method 700 can also perform additional steps based on the techniques described in FIGS. 1-6.

EXAMPLE EMBODIMENTS

Example 1 includes a photonics circuit, comprising: a first optical coupler configured to receive photons and to convert the received photons from a fundamental mode to a higher-order mode; a first Bragg resonator configured to receive the received photons from the first optical coupler, the first Bragg resonator comprising: a first primary Bragg element configured to receive the photons in the higher-order mode; a second primary Bragg element; and at least one first waveguide separating the first primary Bragg element and the second primary Bragg element, wherein the at least one first waveguide is configured to generate entangled photons in the fundamental mode from the received photons in the higher-order mode, wherein the first primary Bragg element and the second primary Bragg element are configured to reflect the received photons, and wherein at least one of the first primary Bragg element or the second primary Bragg element is configured to pass the generated entangled photons in the fundamental mode; and at least one output port coupled to the first Bragg resonator, wherein the at least one output port is configured to output the generated entangled photons.

Example 2 includes the photonics circuit of Example 1, wherein the first primary Bragg element and the second primary Bragg element are configured to pass the generated entangled photons in the fundamental mode.

Example 3 includes the photonics circuit of any of Examples 1-2, wherein the received photons propagate in the first Bragg resonator at a first wavelength, wherein the generated entangled photons propagate in the first Bragg resonator at a second wavelength, wherein the first Bragg resonator is resonant for the received photons at the first wavelength and not the second wavelength.

Example 4 includes the photonics circuit of any of Examples 1-3, further comprising a second Bragg resonator, wherein the first Bragg resonator is nested within the second Bragg resonator, the second Bragg resonator comprising: a first secondary Bragg element; a second secondary Bragg element; and at least one second waveguide coupled between the first secondary Bragg element; and the second secondary Bragg element, wherein the second Bragg resonator is resonant for the generated entangled photons and not the received photons.

Example 5 includes the photonics circuit of Example 4, wherein the first and second secondary Bragg elements are positioned to generate an unequal rate of generated entangled photons output between the first primary Bragg element and the second primary Bragg element.

Example 6 includes the photonics circuit of any of Examples 1-5, wherein the second primary Bragg element is configured to convert the received photons in the higher-order mode to the fundamental mode, and wherein the first primary Bragg element is configured to convert the received photons in the fundamental mode to the higher-order mode.

Example 7 includes the photonics circuit of any of Examples 1-6, wherein the at least one output port comprises a first output coupler and a second output coupler, wherein the first output coupler is coupled to the first primary Bragg element, and wherein the second output coupler is coupled to the second primary Bragg element.

Example 8 includes the photonics circuit of any of Examples 1-7, wherein the at least one output port comprises a circular configuration of waveguides that couples the outputs from the first primary Bragg element and the second primary Bragg element to a second optical coupler, wherein the circular configuration of waveguides functions as a resonator for the generated entangled photons.

Example 9 includes a system, comprising: a light source configured to generate pump photons in a fundamental mode; a first optical coupler coupled to the light source and configured to receive the pump photons and to convert the received photons to a higher-order mode; a first Bragg resonator configured to receive the pump photons from the first optical coupler, the first Bragg resonator comprising: a first primary Bragg element configured to receive the pump photons in the higher-order mode; a second primary Bragg element; and at least one first waveguide separating the first primary Bragg element and the second primary Bragg element, wherein the at least one first waveguide is configured to generate entangled photons in the fundamental mode from the pump photons in the higher-order mode, wherein the first primary Bragg element and the second primary Bragg element are configured to reflect the pump photons, and wherein at least one of the first primary Bragg element or the second primary Bragg element is configured to pass the generated entangled photons in the fundamental mode; and at least one output port coupled to the first Bragg resonator, wherein the at least one output port is configured to output the generated entangled photons.

Example 10 includes the system of Example 9, wherein the light source, the first optical coupler, the first Bragg resonator, and the at least one output port are disposed on an integrated photonics chip.

Example 11 includes the system of any of Examples 9-10, wherein the first optical coupler is configured to convert the pump light photons from the fundamental mode to a second-order mode.

Example 12 includes the system of Example 11, wherein the first optical coupler is an asymmetric directional coupler.

Example 13 includes the system of any of Examples 9-12, wherein the first primary Bragg element and the second primary Bragg element are configured to pass the generated entangled photons in the fundamental mode.

Example 14 includes the system of any of Examples 9-13, wherein the pump photons propagate in the first Bragg resonator at a first wavelength, wherein the generated entangled photons propagate in the first Bragg resonator at a second wavelength, wherein the first Bragg resonator is resonant for the pump photons at the first wavelength and not the second wavelength.

Example 15 includes the system of any of Examples 9-14, further comprising a second Bragg resonator, wherein the first Bragg resonator is nested within the second Bragg resonator, the second Bragg resonator comprising: a first secondary Bragg element; a second secondary Bragg element; and at least one second waveguide coupled between the first secondary Bragg element; and the second secondary Bragg element, wherein the second Bragg resonator is resonant for the generated entangled photons and not the pump photons.

Example 16 includes the system of Example 15, wherein the first and second secondary Bragg elements are positioned to generate an unequal rate of generated entangled photons output between the first primary Bragg element and the second primary Bragg element.

Example 17 includes the system of any of Examples 9-16, wherein the first optical coupler is positioned external to the first Bragg resonator.

Example 18 includes the system of any of Examples 9-17, wherein the second primary Bragg element is configured to convert the received photons in the higher-order mode to the fundamental mode, and wherein the first primary Bragg element is configured to convert the received photons in the fundamental mode to the higher-order mode.

Example 19 includes a method, comprising: generating photons in a fundamental mode; converting, by an optical coupler, the photons from the fundamental mode to a higher-order mode; generating, by a Bragg resonator configured to receive the photons from the optical coupler, entangled photons in the fundamental mode from the converted photons in the higher-order mode; outputting the generated entangled photons from the Bragg resonator.

Example 20 includes the method of Example 19, further comprising: converting, from a first Bragg element of the Bragg resonator, the photons from the fundamental mode to the higher-order mode; and converting, from a second Bragg element of the Bragg resonator, the photons from the higher-order mode to the fundamental mode.

The terms "about", "approximately", or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A photonics circuit, comprising:
   a first optical coupler configured to receive photons and to convert the received photons from a fundamental mode to a higher-order mode;
   a first Bragg resonator configured to receive the received photons from the first optical coupler, the first Bragg resonator comprising:
     a first primary Bragg element configured to receive the photons in the higher-order mode;
     a second primary Bragg element; and
     at least one first waveguide separating the first primary Bragg element and the second primary Bragg element, wherein the at least one first waveguide is configured to generate entangled photons in the fundamental mode from the received photons in the higher-order mode,
   wherein the first primary Bragg element and the second primary Bragg element are configured to reflect the received photons, and wherein at least one of the first primary Bragg element or the second primary Bragg element is configured to pass the generated entangled photons in the fundamental mode; and
   at least one output port coupled to the first Bragg resonator, wherein the at least one output port is configured to output the generated entangled photons.

2. The photonics circuit of claim 1, wherein the first primary Bragg element and the second primary Bragg element are configured to pass the generated entangled photons in the fundamental mode.

3. The photonics circuit of claim 1, wherein the received photons propagate in the first Bragg resonator at a first wavelength, wherein the generated entangled photons propagate in the first Bragg resonator at a second wavelength, wherein the first Bragg resonator is resonant for the received photons at the first wavelength and not the second wavelength.

4. The photonics circuit of claim 1, further comprising a second Bragg resonator, wherein the first Bragg resonator is nested within the second Bragg resonator, the second Bragg resonator comprising:
   a first secondary Bragg element;
   a second secondary Bragg element; and
   at least one second waveguide coupled between the first secondary Bragg element; and the second secondary Bragg element,
   wherein the second Bragg resonator is resonant for the generated entangled photons and not the received photons.

5. The photonics circuit of claim 4, wherein the first and second secondary Bragg elements are positioned to generate an unequal rate of generated entangled photons output between the first primary Bragg element and the second primary Bragg element.

6. The photonics circuit of claim 1, wherein the second primary Bragg element is configured to convert the received photons in the higher-order mode to the fundamental mode, and wherein the first primary Bragg element is configured to convert the received photons in the fundamental mode to the higher-order mode.

7. The photonics circuit of claim 1, wherein the at least one output port comprises a first output coupler and a second output coupler, wherein the first output coupler is coupled to the first primary Bragg element, and wherein the second output coupler is coupled to the second primary Bragg element.

8. The photonics circuit of claim 1, wherein the at least one output port comprises a circular configuration of waveguides that couples the outputs from the first primary Bragg element and the second primary Bragg element to a second optical coupler, wherein the circular configuration of waveguides functions as a resonator for the generated entangled photons.

9. A system, comprising:
   a light source configured to generate pump photons in a fundamental mode;
   a first optical coupler coupled to the light source and configured to receive the pump photons and to convert the received photons to a higher-order mode;
   a first Bragg resonator configured to receive the pump photons from the first optical coupler, the first Bragg resonator comprising:
     a first primary Bragg element configured to receive the pump photons in the higher-order mode;

a second primary Bragg element; and at least one first waveguide separating the first primary Bragg element and the second primary Bragg element, wherein the at least one first waveguide is configured to generate entangled photons in the fundamental mode from the pump photons in the higher-order mode, wherein the first primary Bragg element and the second primary Bragg element are configured to reflect the pump photons, and wherein at least one of the first primary Bragg element or the second primary Bragg element is configured to pass the generated entangled photons in the fundamental mode; and at least one output port coupled to the first Bragg resonator, wherein the at least one output port is configured to output the generated entangled photons.

10. The system of claim 9, wherein the light source, the first optical coupler, the first Bragg resonator, and the at least one output port are disposed on an integrated photonics chip.

11. The system of claim 9, wherein the first optical coupler is configured to convert the pump light photons from the fundamental mode to a second-order mode.

12. The system of claim 11, wherein the first optical coupler is an asymmetric directional coupler.

13. The system of claim 9, wherein the first primary Bragg element and the second primary Bragg element are configured to pass the generated entangled photons in the fundamental mode.

14. The system of claim 9, wherein the pump photons propagate in the first Bragg resonator at a first wavelength, wherein the generated entangled photons propagate in the first Bragg resonator at a second wavelength, wherein the first Bragg resonator is resonant for the pump photons at the first wavelength and not the second wavelength.

15. The system of claim 9, further comprising a second Bragg resonator, wherein the first Bragg resonator is nested within the second Bragg resonator, the second Bragg resonator comprising:

a first secondary Bragg element;

a second secondary Bragg element; and at least one second waveguide coupled between the first secondary Bragg element; and the second secondary Bragg element, wherein the second Bragg resonator is resonant for the generated entangled photons and not the pump photons.

16. The system of claim 15, wherein the first and second secondary Bragg elements are positioned to generate an unequal rate of generated entangled photons output between the first primary Bragg element and the second primary Bragg element.

17. The system of claim 9, wherein the first optical coupler is positioned external to the first Bragg resonator.

18. The system of claim 9, wherein the second primary Bragg element is configured to convert the received photons in the higher-order mode to the fundamental mode, and wherein the first primary Bragg element is configured to convert the received photons in the fundamental mode to the higher-order mode.

19. A method, comprising:

generating photons in a fundamental mode;

converting, by an optical coupler, the photons from the fundamental mode to a higher-order mode;

generating, by a Bragg resonator configured to receive the photons from the optical coupler, entangled photons in the fundamental mode from the converted photons in the higher-order mode;

outputting the generated entangled photons from the Bragg resonator.

20. The method of claim 19, further comprising:

converting, from a first Bragg element of the Bragg resonator, the photons from the fundamental mode to the higher-order mode; and converting, from a second Bragg element of the Bragg resonator, the photons from the higher-order mode to the fundamental mode.

* * * * *